Nov. 15, 1932.  A. OBERHOFFKEN  1,888,091
HYDRAULIC FEED MECHANISM
Filed July 15, 1929   5 Sheets-Sheet 1

Inventor
Alexander Oberhoffken
By Swan & Frye
ATTORNEYS

Nov. 15, 1932. A. OBERHOFFKEN 1,888,091
HYDRAULIC FEED MECHANISM
Filed July 15, 1929 5 Sheets-Sheet 3

INVENTOR
Alexander
Oberhoffken
BY
Swan & Frye
ATTORNEYS

Nov. 15, 1932.　　　A. OBERHOFFKEN　　　1,888,091
HYDRAULIC FEED MECHANISM
Filed July 15, 1929　　　5 Sheets-Sheet 4
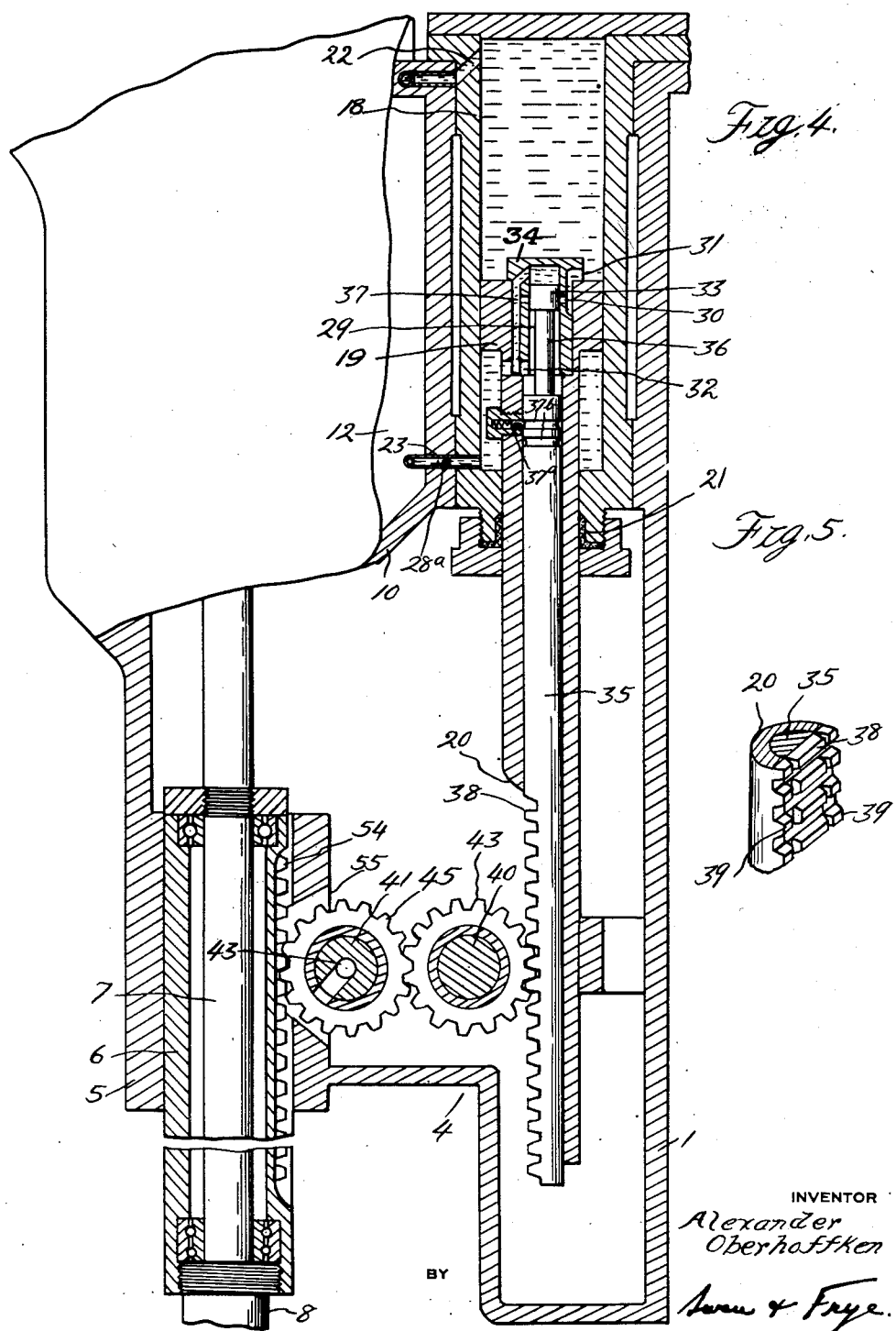
INVENTOR
Alexander
Oberhoffken
BY
Swan & Frye
ATTORNEYS Nov. 15, 1932.    A. OBERHOFFKEN    1,888,091
HYDRAULIC FEED MECHANISM
Filed July 15, 1929    5 Sheets-Sheet 5
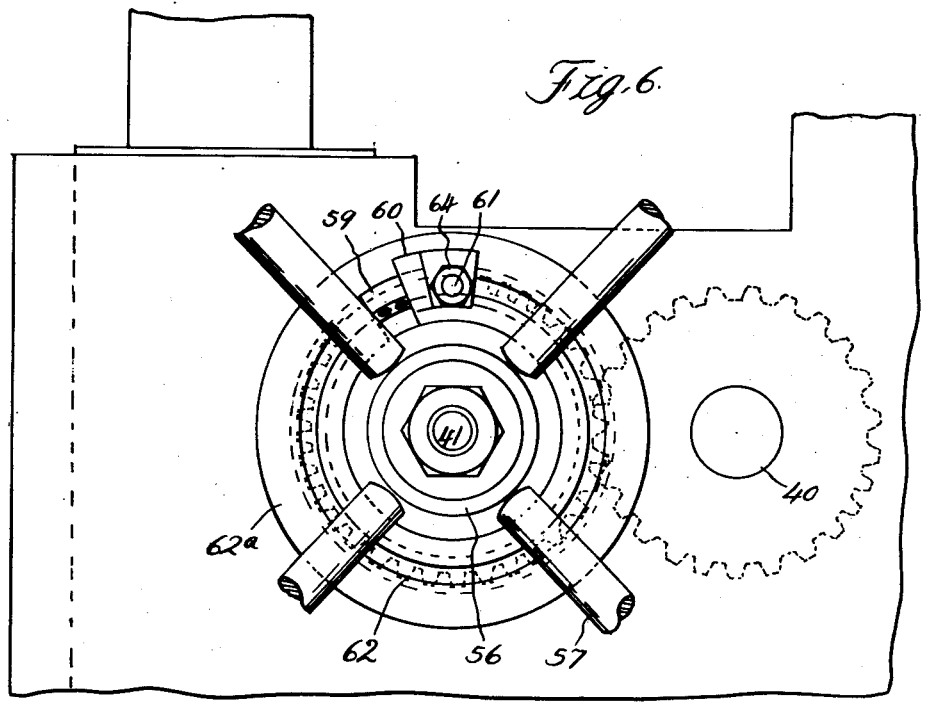
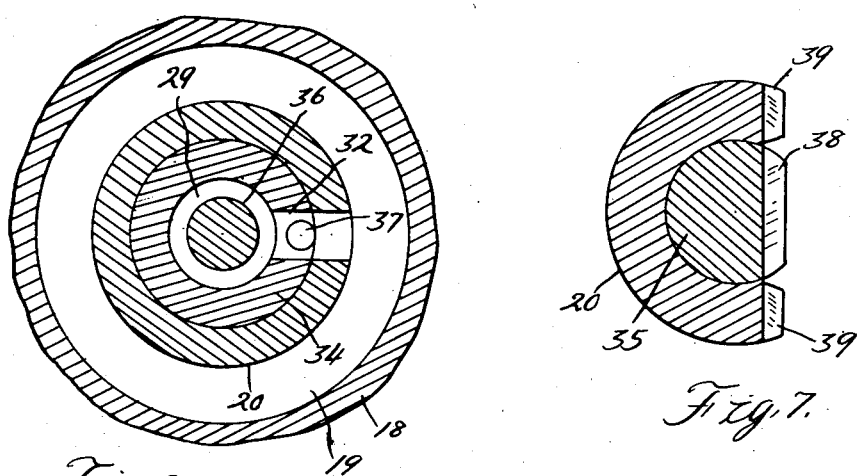
INVENTOR
Alexander Oberhoffken
BY
Swan & Frye
ATTORNEYS Patented Nov. 15, 1932

1,888,091

UNITED STATES PATENT OFFICE

ALEXANDER OBERHOFFKEN, OF DETROIT, MICHIGAN, ASSIGNOR TO PRODUCTION ENGINEERING COMPANY, OF DETROIT, MICHIGAN, A CORPORATION OF MICHIGAN

HYDRAULIC FEED MECHANISM

Application filed July 15, 1929. Serial No. 378,380.

This invention relates to hydraulic feed mechanisms for drill presses and other machines.

An object of the invention is to adapt a reciprocatory machine tool to be advanced manually to the work, and to be fed thereinto either manually or hydraulically, and to provide a simple means for quickly changing from the manual to the hydraulic drive, and vice versa.

Another object is to adapt a rotative machine tool to be manually advanced into contact with the work, and to utilize such contact to automatically establish a power feed to said tool.

A further object is to adapt a machine tool to be manually advanced into contact with the work and to be hydraulically actuated in its subsequent cutting stroke by a suitable motor, and to utilize said contact to shift a valve member to a position energizing the hydraulic motor.

Still another object is to provide a rotatively actuable member for effecting a manual advance or retraction of a machine tool, having also a power feed, and to further utilize said member for controlling its power feed.

A still further object is to establish a feeding drive to a reciprocatory tool holder through racks and gears from a member hydraulically actuable in parallelism with said holder.

It is also an object to derive power to feed a reciprocatory machine tool into the work from travel of a piston in a cylinder, and to provide for either a free circulation of fluid through said piston and cylinder or for actuating the piston by the fluid pressure.

These and various other objects the invention attains by the construction hereinafter described and illustrated in the accompanying drawings, wherein:

Figure 4 is a similar view showing power applied to the piston of the hydraulic motor, and said piston in an intermediate driving position.

Figure 5 is a fragmentary perspective view of the upper portion of the tubular piston rod of the hydraulic motor.

Figure 6 is a fragmentary front view of the press, showing the hub portion of a capstan wheel, through which the feed mechanism is controlled.

Figure 7 is a fragmentary cross section taken upon the line 7—7 of Figure 1 and showing a tubular piston rod and valve stem carried thereby.

Figure 8 is a cross section taken upon the line 8—8 of Figure 3 and showing certain details of the hydraulic motor piston.

Figure 1:
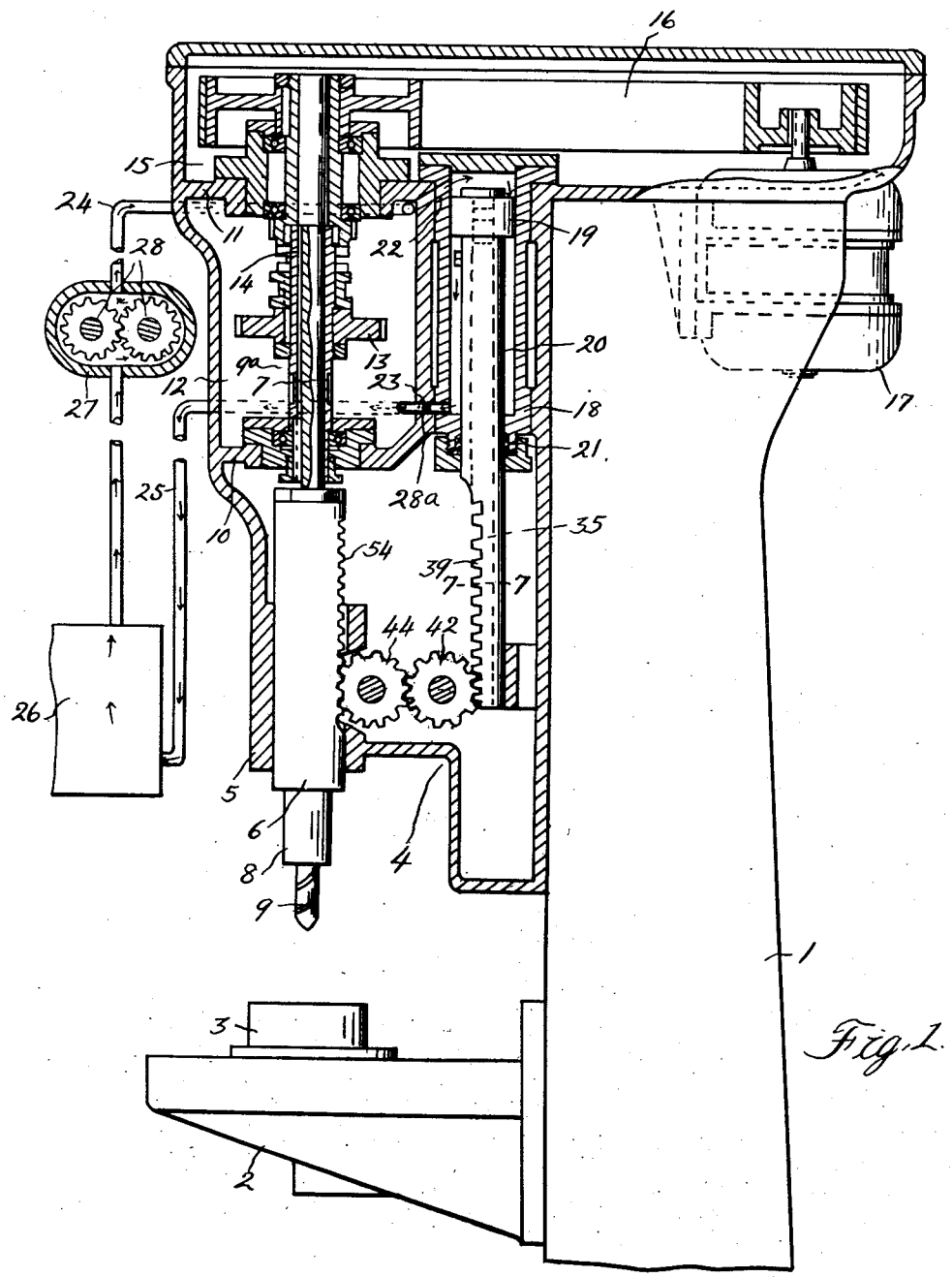
Figure 1 is a view in sectional elevation of a drill press equipped with the herein disclosed hydraulic feed mechanism, diagrammatically showing the hydraulic pressure system.

In these views the reference character 1 designates a standard forming part of a drill press frame and carrying a bracket 2 upon which the work may be mounted, as indicated at 3. Rigidly engaging one side of said frame is a housing 4, formed with a bearing 5, slidably mounting the quill 6 of a drill spindle 7, the latter being journaled in said quill as is comon practice (see Figure 4). Below said quill the spindle rigidly carries the usual holder 8 for a drill 9 or other machine tool, which, as will presently appear, may be advanced to (or into) the work and withdrawn therefrom by a feed applied to the quill.

Above the quill, the spindle is splined into a tubular shaft 9a, journaled in a pair of anti-friction bearings carried by cross partitions 10 and 11, between which is formed a compartment 12 for receiving a change-speed gearing 13, such as is commonly provided in drill presses. A clutch 14, slidable in said compartment on the shaft 9a, controls the gearing 13, as is likewise common.

Above the partition 11 the housing 4 is formed with a compartment 15 extending above the standard 1 and housing a belt 16, or other suitable means for driving the shaft 9a from an electric motor 17 (or other suitable prime mover) carried by the standard 1. The spindle 7 slides in the shaft 9a when the quill is being fed upwardly or downwardly, the splined engagement of said shaft and spindle maintaining their rotation in unison.

Describing now the feed mechanism of said press, 18 designates a cylinder vertically and rigidly mounted in the housing 4, preferably adjacent to the top of the standard 1. In said cylinder is reciprocated a piston 19 from which a tubular rod 20 projects downwardly, slidably passing through a suitably packed bearing 21 in the lower cylinder head. In its upper and lower ends, respectively, the cylinder 18 is formed with an inlet 22 and an outlet 23 for an actuating fluid such as oil. Pipes 24 and 25 connect said inlet and outlet to a reservoir 26, and at some suitable point in this fluid system a high pressure pump is provided. Preferably, said pump is connected in the oil delivery pipe 24, and as illustrated in Figure 1, comprises a casing 27 and an intermeshing pair of gears 28 therein adapted to be driven in any suitable manner (not shown) at regulable speeds. A relief valve 28a so controls the port 23 as to keep the cylinder constantly filled with liquid and ready for immediate response to control mechanism which will now be described.

The piston 19 is formed with a passage therethrough so controlled by a suitable valve member as to afford the liquid entering by port 22 a free downward flow in one position of said valve member, while in another position thereof, pressure of such liquid is applied to said piston. Thus, as best appears in Figure 4, the piston is formed with an axial bore 29, the upper part of which is connected by a port 30 with a passage 31 opening above said piston, and from the lower portion of said bore a port 32 opens into the cylinder below the piston. A plunger valve 33 fitted in said bore registers with the port 30, as shown in Figure 4 when lowered, and when raised (see Figure 3) leaves a clear passage through said bore between the ports 30 and 32. As illustrated, the bore 29, ports 30 and 32, and passage 31 are formed in a member 34 inserted in the upper portion of the piston.

Integrally or otherwise rigidly connected to the valve 33 is a stem 35 slidable in the rod 20, said stem and rod both projecting below the cylinder into the lower portion of the housing 4. That portion of said stem which enters the piston 19 is reduced in diameter as indicated at 36, to provide at times for a flow of the motive fluid from the port 30 to the port 32. From the upper end of the bore 29 a passage 37 is extended through the member 34 into communication with the port 32 for venting fluid from above the valve member 33 when the latter is upwardly actuated. The stem 35 is adapted to be yieldably held either raised or lowered in the rod 20 by a spring-pressed detent 37a radially slidable in said rod and engageable in either of two shallow annular grooves 37b suitably spaced in said stem. Said grooves are so rounded as to permit retraction of the detent responsive to a predetermined force acting longitudinally on the rod or stem.

The lower portion of the stem 35 is formed with a rack of teeth 38 upon its side facing the quill 6, and the corresponding portion of the rod 20 is laterally cut away (or otherwise left open) to expose said rack. Upon the longitudinal edges of this lateral opening in the lower portion of the stem 20 are formed racks 39, one at each side of the rack 38. Between said racks and the quill 6 a pair of shafts 40 and 41 are journaled in the casing 5 in the same horizontal plane and transversely to the axes of the quill and the rod 20. Upon the shaft 40 are mounted two pinions 42 respectively meshing with the racks 39, and journaled on said shaft between said pinions is a third pinion 43 rotatable independently of the pinions 42 and meshing with the rack 38.

Upon the shaft 41 is journaled a pair of spaced pinions 44, meshing with the pinions 42, and between the pinions 44 a third pinion 45 is keyed upon said shaft as indicated at 46, and meshes with the pinion 43. The pinions 44 are normally loose on their shaft, but one thereof is adapted to be rigidly connected to said shaft by a sliding key 47, fitted into a radial groove 48 in said shaft and formed with a tooth 49 at its inner end, normally registering with a keyway in the pinion 45, as shown in full lines in Figure 2, and inwardly actuable as indicated in dash lines to engage a keyway 50 in one of the pinions 44 to thereby rigidly connect the latter to the shaft. Said key projects beyond the rear end of the shaft 41, exteriorly of the casing 4 and is preferably terminally formed with an actuating knob 51. To hold said key in either described position, it is preferred to mount in the shaft 41 a ball detent 52, spring-pressed against said key to lodge in either of two shallow pockets 53 in the latter.

Figure 2:
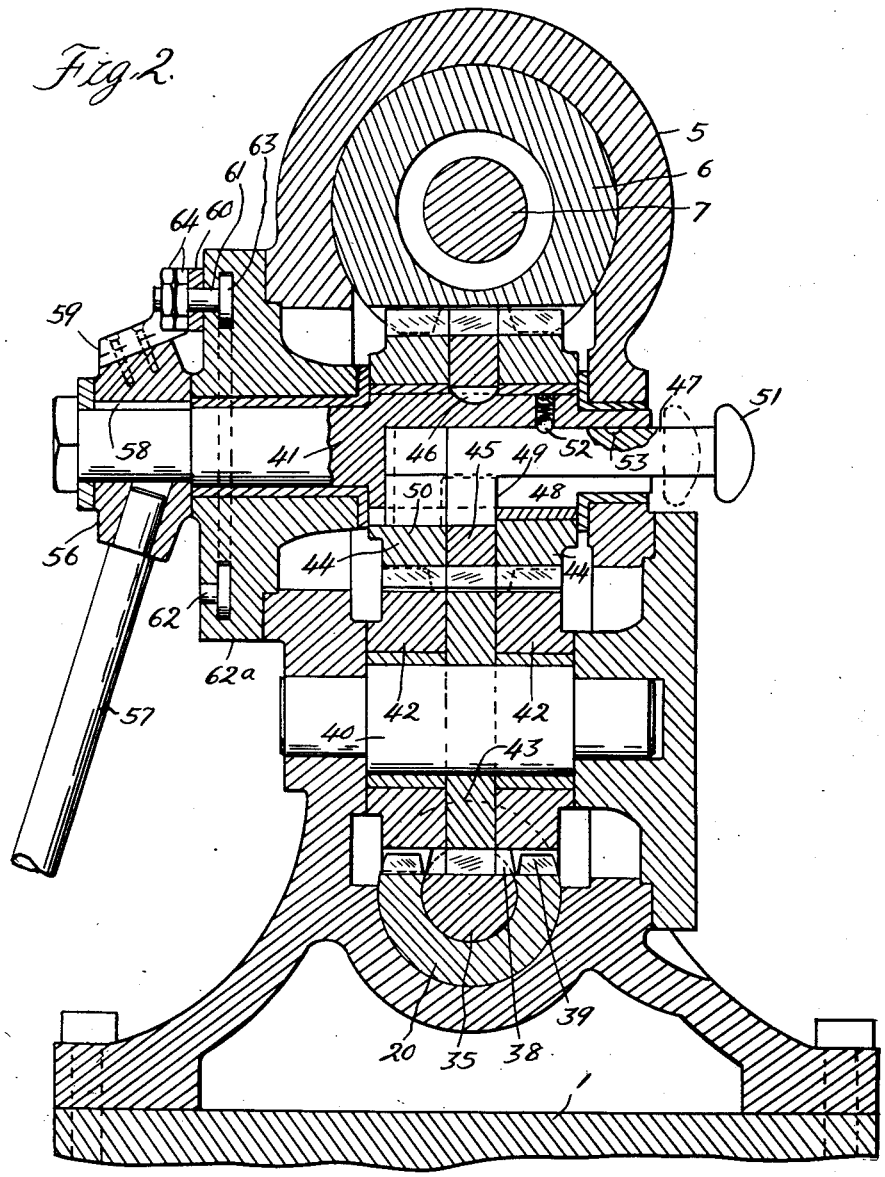
Figure 2 is a horizontal sectional view of the same taken upon the line 2—2 of Figure 3.

The pinions 44 furthermore mesh with two spaced racks 54 formed on the quill 6, as best appears in Figures 2 and 4, there being a clearance space between said racks wherein the pinion 45 may turn freely. To allow the pinions 44 to thus engage the racks 54, the bearing 5 is cut away (or otherwise formed with a lateral opening) as indicated at 55 (see Figure 4).

The shaft 41 projects forwardly of the casing 4, as best appears in Figure 2, to rigidly carry a member for manually turning said shaft. Said member preferably has the nature of a capstan wheel comprising a hub 56 and levers 57 radially projecting therefrom, providing for the manual application of a heavy torque to said shaft. The hub 56, as illustrated, is keyed at 58 to the shaft 41 and rigidly carries a stop finger 59 coacting with a stop member 60 carried by the casing. Preferably the member 60 is adjustable to any desired position in the orbit of the finger, and as appears in Figure 2, this adjustability is secured by mounting the member 60 upon a bolt 61 entering a circular slot 62 in a plate 62a covering an opening at the front of the casing 4, said slot being undercut to receive a head 63 on said bolt. The outer end portion of the bolt carries nuts 64 for locking the stop in a desired orbital adjustment. It will hereafter appear that the finger 59 coacts with the stop member 60 to variably limit the downward feed of the drill 9 into the work.

In the operation of the described feed mechanism, it is to be understood that the pump 27, 28 is continuously energized and that the driven speed of said pump is regulated according to the desired rate of advance of the drill into the work. This regulation may be accomplished in any well known manner, as by driving the pump from a variable speed motor (not shown) or through a change speed gearing (not shown). It is further to be understood that the spindle 7 will be continuously rotatively driven from the motor 17 through the belt 16 at a speed determined by the gearing 13.

Figure 3:
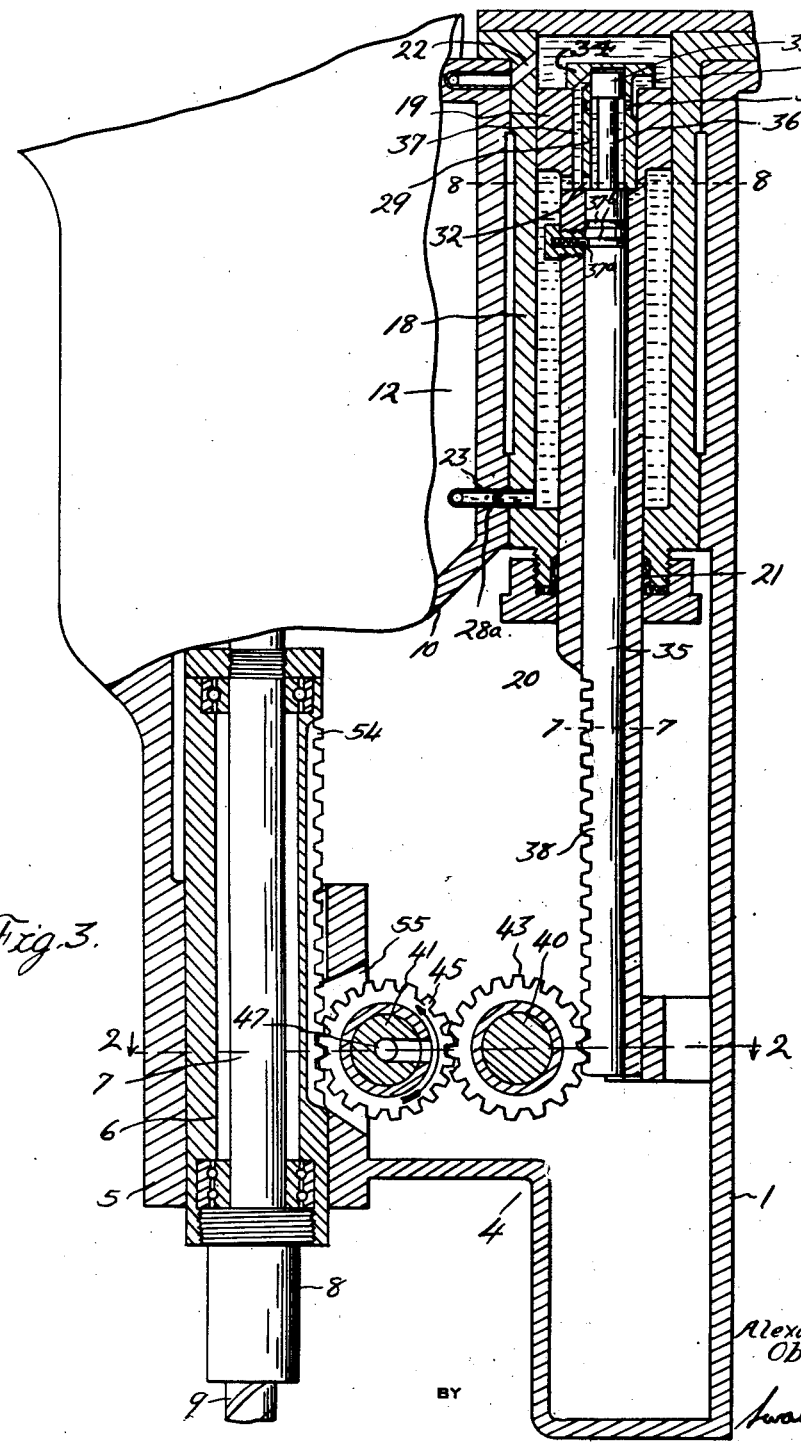
Figure 3 is an enlarged sectional elevation of a portion of the mechanism, showing the hydraulic control valve in a position cutting off hydraulic power.

Initially the plunger valve 33 occupies its upper position shown in Figure 3, in which the fluid continuously entering the cylinder 18 by port 22 passes freely through the passage 31, port 30, bore 29 and port 32 of the piston, discharging from the lower end of the cylinder through the port 23. Thus the piston and parts 20 and 35 connected thereto maintain their initial raised position (see Figure 3) undisturbed by the circulating fluid. To lower the drill 9 (or other tool) into engagement with the work 3, the operator rotates the capstan wheel 56, 57 in the direction of the arrow in Figure 3, the key 47 being at such time outwardly shifted, as shown in full lines in Figure 2. The pinions 44, being loose upon the shaft 41, do not directly respond to such rotation, while the pinion 45, being keyed on said shaft, is driven thereby and acts through the pinion 43 upon the rack 38 to lower the stem 35. Owing to the engagement of said stem by the spring-pressed detent 37a carried by the rod 20, the latter and the piston 19 lower in unison with the stem. Responsive to this downward actuation, the rod 20 acts through the racks 39 and the gears 42 and 44 upon the racks 54 of the quill 6 to feed the latter together with the spindle 7 downwardly and engage the tool 9 with the work. The quill being then restrained from further actuation of the capstan wheel in the same direction acts through the gears 45 and 43 to lower the stem 35 to the position shown in Figure 4, in which the detent 37a engages in the uppermost groove 37b and the valve member 33 closes the port 30. The fluid passage through the piston being thus closed, fluid pressure above the piston lowers the latter at a rate predetermined by the driven speed of the pump 27, 28, and the tool 9 is hydraulically fed into the work through the racks 39, acting through the pinions 42 and 44 upon the quill racks 54.

When the tool 9 has penetrated the work to a predetermined extent, the stop finger 59 encounters the stop member 60, restraining the capstan wheel from further rotation. Said wheel then reacts through the pinions 45 and 43 upon the stem 35 to hold the latter stationary, and a slight further downward travel of the rod 20 raises the plunger valve 33 and cuts off the hydraulic drive, as has been explained. It will be noted that the operator may manually cut off the hydraulic drive at any desired time by simply holding the capstan wheel from turning, or by reversing through a slight angle the rotation of said wheel accompanying the hydraulic drive, the effect being to raise the stem 35 and valve 33, as when the automatic stop takes effect.

The described mechanism furthermore permits a manual feed of the tool into the work as desired. In establishing such a feed, the operator shifts the key 47 inwardly to secure one of the pinions 44 upon the shaft 41 and then rotates the capstan wheel in the direction of the arrow in Figure 3. Under these conditions, the pinion 44 engaged by said key acts through the corresponding racks 54 to lower the quill member 6, and incidentally the piston 19, rod 20, and stem 35 are at the same time lowered by the gears 44, 42, and 45, 43. Such a unitary lifting of the parts 19, 20 and 35 involves no movement of the valve 33 relative to port 30, so that free circulation of fluid through the cylinder continues. Retraction of the tool from the work is manually accomplished by rotating the capstan wheel reversely to the direction indicated by the arrow in Figure 3.

The described feed mechanism is adapted to be very simply and quickly controlled and accomplishes a valuable saving of time and effort in operation of drill presses and the like, particularly in the automatic energization of the hydraulic feed responsive to the initial engagement of the tool with the work. Thus the operator may very rapidly shift the tool to its initial effective position, whereupon the relatively slow cutting feed is automatically initiated. Also, the automatic cut-off of the hydraulic feed effects a desirable saving of time, permitting the operator to immediately manually retract the tool from the work at a rapid rate.

While the improved hydraulic feed has been described and illustrated as applied to a spindle downwardly actuable toward the work, it is evident that said mechanism is equally applicable to an upwardly or horizontally fed spindle, as well as to any other type of machine in which a tool or the like must be advanced or retracted at varying speeds.

What I claim is:

1. In a feed mechanism, the combination with a reciprocatory tool holder, of a fluid motor comprising a cylinder and a piston reciprocatory therein, a valve member carried by said piston and controlling the application of fluid pressure thereto, a tubular rod connected to said piston and projecting from the cylinder, a stem connected to said valve member and extending through said rod, the rod and stem being formed with gear racks, a gear meshing with the rack of said rod and establishing a drive therefrom to said tool holder for advancing the latter to the work, a coaxial gear meshing with the rack on said stem, and means for actuating the last-mentioned gear to control said valve member.

2. In a feed mechanism, the combination with a longitudinally slidable but positively driven spindle, a tool holder carried by said spindle and a reciprocable quill journaling said spindle, of a rod reciprocable substantially parallel to said quill, said rod and quill carrying opposed racks, a motor for longitudinally actuating said rod, intermediate gearing meshing with said racks adapted to actuate the quill from said rod, manual actuating means for longitudinally moving said rod and quill independently of said motor, and means for controlling said motor from the same manual actuating means.

3. In a feed mechanism, the combination with a spindle, a tool holder carried thereby and a reciprocatory quill journaling said spindle, of a rod reciprocatory parallel to said quill, said rod and quill carrying opposed racks, gearing engaging said racks for actuating the quill from said rod, a motor adapted to reciprocate said rod, a control member for said motor slidable in said rod, a gearing coaxial with the first named gearing for actuating said control member, an element for alternatively manually actuating said quill through the first named gearing and actuating said control member through the last-named gearing, and a member adjustable to selectively connect said gearings to said element.

In testimony whereof I sign this specification.

ALEXANDER OBERHOFFKEN.